United States Patent Office 3,315,698
Patented Apr. 25, 1967

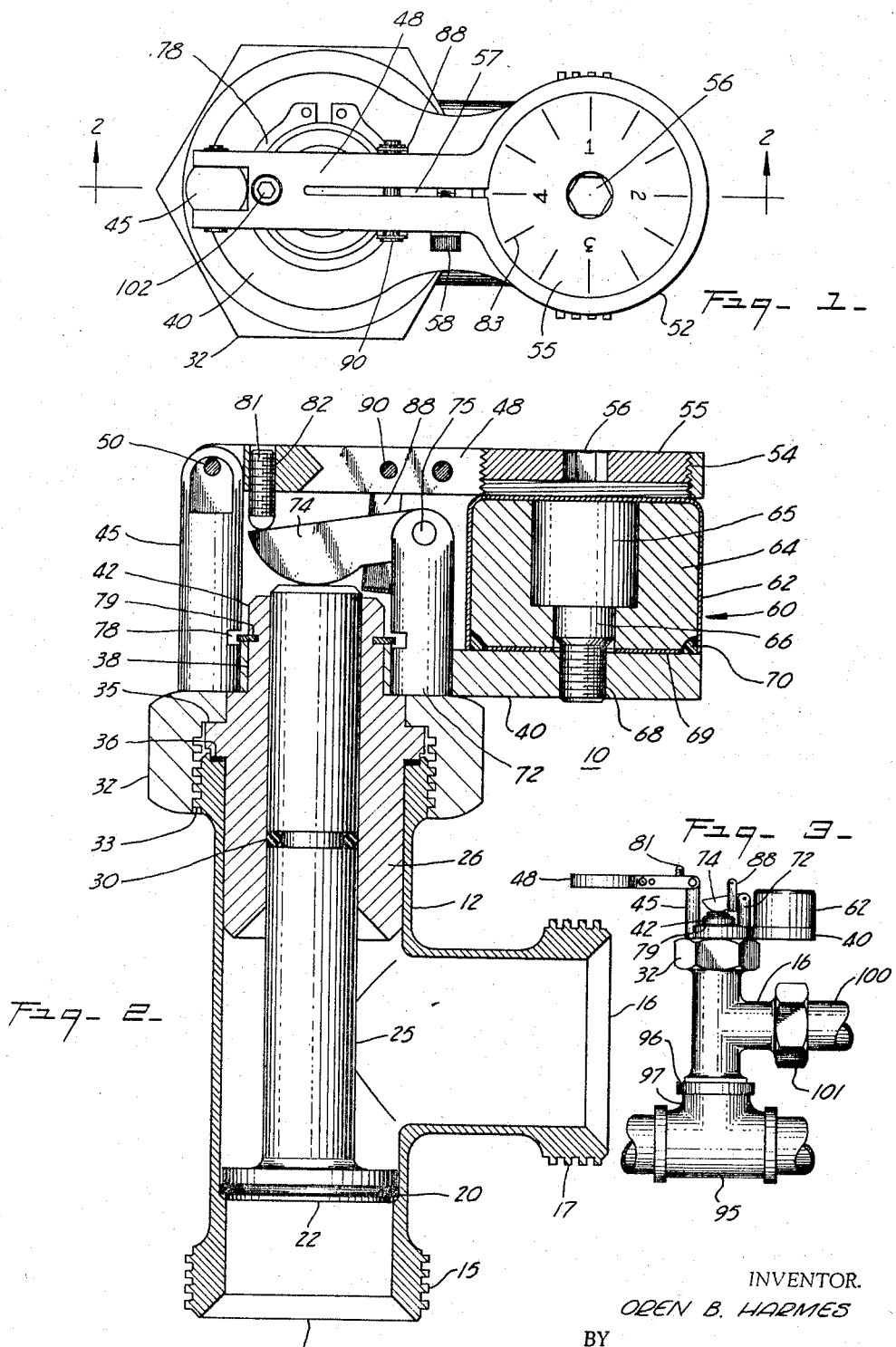

3,315,698
RELIEF VALVE HAVING CONVERTIBLE
RESET MEANS
Oren B. Harmes, Box 148, Algona, Iowa 50511
Filed Nov. 20, 1963, Ser. No. 324,914
5 Claims. (Cl. 137—269)

This invention relates to pressure relief valves and more particularly to an improved pressure relief valve having a magnet system to balance the pressure applied to the valve which is adjustable to control valve operation over a wide range of pressures. This improved pressure relief valve may be utilized as either a manual or automatic reset type valve.

Pressure relief valves are well-known and in use. In certain applications, the pressure relief valve is required to move to an open position under the presence of a predetermined pressure applied thereto for the purpose of effecting a complete adjustment on a pressure in a system. Conventional pressure relief valves normally do not operate in this manner inasmuch as they are effective to move between an open and closed position upon a change in pressure beyond a predetermined point but will return to the original position as soon as the pressure has again reached the predetermined pressure level. In certain applications, such as in connection with pumps, this recurrent cycling may operate to damage equipment. In these and other applications, it is necessary that the pressure relief valve operate and remain in the operated position until reset. Further, it is desirable in pressure relief valves to have wide ranges in adjustment of the pressure level at which the valve is to operate. Conventional pressure relief valves do not normally attain these results and where such special provisions are provided, the resulting structure in the relief valve is exceedingly complex.

The present invention is directed to an improved pressure relief valve which is simple and compact in design and which may be utilized as an automatic or manually adjustable type reset valve with a wide range of pressure adjustment. This improved pressure relief valve provides for a minimum number of parts and accurate adjustment to be suitable for numerous applications.

Therefore, it is an object of this invention to provide an improved pressure relief valve of the reset type.

Another object of this invention is to provide in a pressure relief valve provision for manual reset and automatic reset with a minimum change in parts.

Still another object of this invention is to provide an improved pressure relief valve which may be used either as a pressure relief valve or as a vacuum breaker.

A still further object of this invention is to provide an improved pressure relief valve which utilizes a magnetic type valve retaining system which is accurately adjustable over a wide range of response pressures.

A further object of this invention is to provide in a device of this type a simple, compact arrangement of parts which is inexpensive to manufacture and easy to maintain.

These and other objects of this invention will become apparent from a reading of the attached description together with the drawings wherein:

FIGURE 1 is a plan view of the improved reset type pressure relief valve,

FIGURE 2 is a side elevation view of the improved reset type pressure relief valve in section, and FIGURE 3 is a schematic view of the improved reset type pressure relief valve connected to conduits with the valve in an operated or open position.

The improved pressure relief valve of the reset type is shown in plan and elevational views in FIGURES 1 and 2 respectively with a general designation of 10. This improved pressure relief valve includes a valve body 12 having ports 14 and 16 therein which are threaded at 15 and 17, respectively, for the purpose of connecting the valve to piping or conduits, as will be hereinafter noted. Positioned within the valve body and intermediate the ports 14 and 16 is a valve seat 20 having a cooperating valve closure member or valve element 22 associated therewith. The valve closure member 22 moves relative to the valve seat 22 to control communication or flow between the valve ports 14, 16 within the interior of the valve body 12 in a conventional manner. The valve closure member 22 includes an operating shaft 25 which is slidably mounted in a bonnet 26 positioned in the valve body with the shaft 25 being sealed within the bonnet through a suitable sealing member, such as is indicated at 30. As will be seen in FIGURE 2, the shaft 25 and bonnet 26 extend beyond the valve body 12, and the bonnet 26 is retained on the valve body 12 through a bonnet nut 32 which nut threads on to a threaded portion 33 of the valve body and includes a shoulder portion 35 which retains the bonnet 26 on the valve body. A suitable sealing ring 36 is included between the bonnet 26 and the valve body 12 to seal the valve body at this point.

The extremity of the bonnet 26 which extends beyond the valve body 12 and bonnet nut 32 fits through an aperture 38 in a flange member or plate 40 which is loosely positioned on the valve body. This extremity of the bonnet, which is indicated at 42, extends beyond the surface of the flange member or plate 40 with the operating shaft 25 of the valve closure member 22 extending beyond the bonnet portion 42, for purposes to be later noted. Flange member or plate 40 includes an upstanding pivot member 45 which is welded or suitably secured to the flange member 40 and carries at its free extremity a pivoted lever member 48 which is connected to and pivoted on the pivot member 45 through a suitable pivot pin 50. Lever member 48 has a circular extremity 52 remote from the pivot 50 with a threaded aperture 54 therein in which is positioned a magnetically permeable element or disc 55 having a hexagonal shaped tool opening 56 therein. The pivoted lever member 48 is also split or bifurcated at 57 and has a clamping bolt 58 threaded between the bifurcated portions of the lever member for the purpose of clamping the magnetically permeable element 55 in the circular section 52.

Flange member 40 also mounts a magnet assembly 60 having a stainless steel or non-permeable magnetic material cover 62 thereon with a magnetically permeable mounting member 64 positioned therein which mounts a magnet 65. A suitable bolt means 66 attached to the mounting member 64 threads through a tapped aperture 68 in the flange member 40 for mounting the magnet assembly 60 thereon remote from the pivot member 45 and the bonnet portion 42. The permanent magnet 65 with the mounting member 64 of magnetic permeable material creates a magnetic flux field to attract the magnetically permeable element 55 within the lever member 48 for the purpose of applying a force thereto. The magnet assembly 60 is completed by a collar member 69 which cooperates with the cover 62 to enclose the magnet assembly 60 and includes a sealing material 70 around the edge of the same to protect the soft iron magnetic parts from high moisture conditions, as will be later noted. Lever member 48, with the exception of the magnetic permeable element 55, is made of a non-magnetic or non-permeable magnetic material such that only the magnetic permeable element 55 therein is attracted by the magnet assembly 60.

Also positioned on the flange member 40 is a second upstanding pivot member 72 which is also secured to the flange member 40 through suitable means, such as welding. Pivot member 72 mounts an intermediate pivoted lever member 74 through a suitable pivot pin 75 with the lever member 74 contacting the operating shaft 25 of the valve closure member 22 intermediate its extent. The flange member 40 with the lever member 48 and magnet assembly 60 mounted thereon is held on the bonnet portion 42 of the bonnet 26 through a suitable spring type retaining member 78 which fits into an annular notch 79 in the bonnet portion 42 above the flange member 40 to retain the flange member and its assembly thereon. This assembly provides for retaining the pressure relief valve in a normal valve closed position and the force applied to the valve closure member 22 upon the presence of pressure in the port 14 will be transmitted through the shaft 25 to the pivoted lever member 74. This force is applied by the lever 74 to an adjustable pin 81 threaded into a tapped aperture 82 in the pivoted lever member 48 adjacent the pivot pin 50. The lever members 74 and 48 pivoted on the pivot members 72 and 45 provide a multiplying lever system in which the relatively high force applied to the valve shaft 25 is transmitted to the lever member 48 through moment arms to permit a substantially reduced force at the magnet system 60 and the magnetically permeable element 55 to counteract the movement of the valve and provide a biasing action to retain the valve in a closed position. This permits a relatively lower force magnet system to be utilized in the holding or biasing function of the pressure relief valve to maintan the valve in a predetermined operating position or closed position against the normal pressure applied thereto but permitting opening of the valve upon the presence of a pressure in excess of the desired pressure by the force applied through the shaft 25 to the multiplying lever system overcoming the force of the attraction between the magnet assembly 60 and the magnetically permeable element 55.

As will be seen in FIGURE 1, magnetically permeable element 55 carries indicia or markings 83 thereon which cooperate with the bifurcated portion 57 of the lever member 48 as an index to indicate the relative positioning of the magnetically permeable element within the lever member 48. By threading the magnetically permeable element 55 down into the threaded aperture 54 in the lever member 48, the magnetically permeable element 55 may be brought into proximity with the face of the magnet assembly 60 adjacent the cover 62 enclosing the magnetically permeable mounting member 64 and magnet 65 to increase the attractive force of the magnet system applied to the lever 48. Thus by adjusting the magnetically permeable element within the lever member 48, the air gap between the magnetically permeable element 55 and the magnet assembly 60 will be uniformly adjusted with the air gap being the same dimension or width at all points and accurately adjustable to vary the attractive force of the magnet system applied to the lever 48. This force will establish the break away or relief pressure at which the relief valve will operate to open the passage in the valve body 12 between the ports 14 and 16 for purposes to be later noted. The adjustable pin 81 in the lever 48 will be threaded to a position to engage the lever member 74 when the valve closure member is in a desired closed or hold position. This could be a slightly open position under certain conditions or a completely valve closed position.

Also included in the pressure relief valve is a U-shaped yoke member 88 which is connected to the lever member 48 through a removable connecting pin 90 and extends around lever member 74. The pin 90 is removable to release the yoke member 88 from the lever member 48, when desired. The purpose of this yoke which extends under the pivoted level member 74 is to limit movement of the lever member 48 relative to the magnet assembly 60 for automatic reset of the pressure relief valve, as will be hereinafter described. With the pin 90 removed from the lever member 48, the yoke member 88 will be disconnected therefrom and the pivoted lever member 48 may be moved unrestrained relative to the magnet assembly 60 to a position in which the lever member 48 is pivoted around the pivot member 45 requiring manual reset.

Thus, as will be seen in FIGURE 3, the improved pressure relief valve of the reset type is shown connected to a conduit 95 through a suitable coupling nut 96 which couples a threaded branch conduit 97 of the primary conduit 95 to the threaded portion 15 of the port 14. Similarly, a conduit 100 is shown coupled to the port 16 of the valve body 12 through a suitable coupling nut 101. In FIGURE 3, the pressure relief valve is shown with the lever member 48 pivoted about the pivot member 45 to a position remote from the magnet assembly 60 and overcenter with respect to the pivot member so that it will not automatically return to a position adjacent the magnet assembly 60 under the presence of the attractive force of the magnet system. In FIGURE 3, passage or conduit 95 is included to indicate a primary flow passage of fluid upon which or to which the pressure relief valve 10 is connected for the purpose of preventing a buildup of excess pressure therein beyond a predetermined level. The conduit 100 connected to the port 16 simulates a diverting passage or by-pass passage through which fluid under the excess pressure conditions and operation of the valve 10 will flow or be dumped for protection purposes. Thus assuming that the passage 95 is connected in a line in which excess pressure is to be prevented, such as in a compressor line or in a pressure line for high pressure cookers, or the like, the pressure within the conduit 95 will be applied to the valve closure member 22 when the valve retaining assembly formed by lever member 74 and the lever member 48 with the magnetically permeable element 55 thereon is positioned adjacent the magnet assembly 60 on the flange member 40. The force of magnetic attraction between the magnet assembly 60 and the magnetically permeable element 55 is adjusted by varying the air gap or spacing between the two through adjustment of the element 55 in the lever member 48 which force acting through the elongated moment arm of the lever 48 and applied through the pin 81 to the lever member 74 provides a counteracting or retaining force to the shaft 25 which will establish a predetermined or normal pressure level within the conduit 95 at which the valve 10 will be held in a closed position. Whenever the pressure in the conduit 95 exceeds this predetermined pressure, the buildup of force on the valve closure member 22 will apply force to the shaft 25 and the multiplying lever system including the pivoted lever members 74 and 48 to overcome the attractive force between the magnet assembly 60 and the magnetically permeable element 55. This will cause the lever member 48 to be released or moved from the attracted position and pivot rapidly through movement of the shaft 25 upward within the bonnet 26 until the pivoted lever reaches a position, such as is shown in FIGURE 3, beyond the center of the pivot member 45 where the influence of the magnet assembly 60 can no longer affect the magnetically permeable element 55 thereon. This movement of the valve closure member 22 to a raised position connects the ports 14 and 16 in the valve body 12 to open the valve. The valve closure member 22 will remain in this elevated position permitting complete dumping of the primary conduit 95 into the diverting conduit 100 as a desired safety function. The application of this type of pressure relief valve is required in connection with pumping systems and similar pressurized systems in which a condition of abnormally high pressure in the primary conduit 95 requires maintenance to prevent damage of equipment or product being controlled. Thus the lever 48 when moved to this position requires manual pivoting back to the original rest position adjacent the magnet assembly 60 to reset or close the valve 10. Such reset action is not normally taken until the conditions surrounding the abnormal pressure condition in the primary conduit 95 are investigated and solved. In many process applications, the use of such a pressure relief valve responsive to predetermined pressure levels must be accurately adjusted such that control may be effected at desired pressure levels. While the pressure applied at the pressure relief valve has been referred to herein as pressure applied to the exposed surface of the valve element from a primary conduit 95, the improved valve may be used in connection with vacuum lines in which case the relationship of the ports 14 and 16 will be reversed.

The improved pressure relief valve incorporates basically non-permeable magnetic materials except for the magnetically permeable element and the magnet assembly. Thus, the only elements affecting the attractive force of the magnet system are accurately positioned and adjustable through a very fine range of adjustment to accurately control the force applied to the pressure relief valve and the release force at which the valve will operate. The adjustment of the coupling pin 81 for the desired valve closed position is effected through a suitable tool receiving aperture 102 in the pin 81. This improved valve assembly is also made of materials highly resistant to corrosion or the valve parts are so plated since the improved pressure relief valve is normally utilized under high moisture or humidity conditions. The non-permeable magnetic covering of the magnet assembly 60 which may be made of stainless steel and the sealing material sealing the magnet assembly insures that this portion of the apparatus will not be affected by the moisture conditions of the normal environmental usage of the same. The improved multiplying lever system insures that the force applied through the lever member 74 will effectively rotate the lever member 48 to the position requiring manual reset when excess pressure is applied to the valve assembly.

Under certain conditions of operation, the yoke member 88 is connected to the lever member 48 through the pin 90. Thus the yoke member 88 will encircle the lever member 74 and restrict the movement of the lever member 48 relative to the lever member 74 to maintain a limited displacement between the magnetically permeable element 55 and the magnet assembly 60. This yoke member is utilized under conditions of automatic reset wherein the valve may be reset to the valve closed position without requiring manual operation. Thus, whenever the pressure in a conduit 95 or that applied to the valve closure member 22 exceeds the predetermined level, it may be desired merely to open the valve until the desired pressure level range is reached within the conduit 95 at which time the valve may be again closed. In this arrangement of parts, the yoke member 88, by limiting movement of the lever member 48 relative to the flange member 40, retains the magnetically permeable element 55 in proximity with the magnet assembly 60 and the gravitational effect on the lever members with a drop in pressure in the conduit 95 will cause the shaft 25 to move down to the closed position with the attractive force between the magnetic permeable element 55 and the magnet assembly 60 aiding in the return to and retaining the valve in this position. The improved threaded mounting and positioning of the magnetic permeable element relative to magnet assembly 60 simplifies the calibration of the pressure relief valve and provides for wide ranges of adjustment of the same. The entire valve retaining assembly mounted on the flange member 40 is pivotally mounted on the valve body 12 through the bonnet portion 42 and may be pivoted thereon to extend in any direction for simplified mounting purposes.

The present disclosure is intended to be illustrative only and the scope of the invention should be determined by the appended claims.

I claim:

1. A pressure relief valve comprising, a valve body having a pair of ports therein, a valve seat positioned within said valve body intermediate said ports, a valve closure member including shaft means extending through said valve body with said valve closure member cooperating with said valve seat to control flow of fluid through said valve body between said ports, flange means mounted on said valve body and extending transversely therefrom, a pivoted lever member pivotally mounted on said flange means and movable relative thereto, a circular magnetically permeable element threaded in an aperture in said pivoted lever member remote from the pivot of said lever member, a magnet means mounted on said flange means and positioned adjacent to and in cooperating relationship with said magnetic permeable element on said pivoted lever, an intermediate lever pivotally mounted on said flange means and engageable with the shaft means of said valve closure member, and a coupling linkage mounted in said pivoted lever member and engaging said intermediate lever at a point remote from the pivot of the intermediate lever and engagement of said shaft with said intermediate lever, said coupling linkage being operative to transmit movement of said shaft means through said intermediate lever to the pivoted lever member to move said magnetic permeable element relative to said magnet means, one of the port means of said body being adapted to be connected to a primary conduit having fluid under pressure therein with the fluid applying a pressure differential across said valve closure member to exert a force on said shaft means and upon said intermediate lever with the intermediate lever applying said force through said coupling means to said pivoted lever member which force is counteracted by the force of the magnetic association between the magnetic permeable element and the magnet means on said flange means to hold said valve closure member on said valve seat for normal pressure conditions in the primary conduit, said valve closure member when exposed to a pressure in the primary conduit in excess of said normal pressure being moved to an open position as a result of the force on said shaft means overcoming the force of magnetic association between said magnet means and said magnetic permeable member on said pivoted lever member.

2. A pressure relief valve comprising, a valve body having a pair of ports therein, a valve seat positioned within said valve body intermediate said ports, a valve closure member including shaft means extending through said valve body with said valve closure member cooperating with said valve seat to control flow of fluid through said valve body between said ports, flange means mounted on said valve body and extending transversely therefrom, a pivoted lever member pivotally mounted on said flange means and movable relative thereto, a circular magnetically permeable element threaded in an aperture in said pivoted lever member remote from the pivot of said lever member, a magnet means mounted on said flange means and positioned adjacent to and in cooperating relationship with said magnetic permeable element in said pivoted lever member, an intermediate lever pivotally mounted on said flange means and engageable with the shaft means of said valve closure member, a coupling linkage mounted in said pivoted lever member and engaging said intermediate lever at a point remote from the pivot of the intermediate lever and engagement of said shaft with said inteermediate lever, said coupling linkage being operative to transmit movement of said shaft means through said intermediate lever to the pivoted lever member to move said magnetic permeable element relative to said magnet means, one of the port means of said body being adapted to be connected to a primary conduit having fluid under pressure therein with the fluid applying a pressure differential across said valve closure member to exert a force on said shaft means and upon said intermediate lever and with the intermediate lever applying said force through said coupling means to said pivoted lever member which force is counteracted by the force of the magnetic association between the magnetic permeable element and the magnet means on said flange means to hold said valve closure member on said valve seat for normal pressure conditions in the primary conduit, said valve closure member when exposed to a pressure in the primary conduit in excess of said normal pressure being moved to an open position as a result of the force on said shaft means overcoming the force of magnetic attraction between said magnet means and said magnetic permeable member on said pivoted lever member, and means included in said magnetic permeable element for adjustably positioning said magnetic permeable element releative to said magnet means through rotation of said permeable element in the threaded connection of said pivoted lever member to adjust the level of normal pressure applied to the primary conduit at which said valve closure member will be held in a closed position.

3. The pressure relief valve of claim 2 in which said flange member and said lever member and the intermediate lever are made of a non-permeable magnetic material and the magnetic permeable element and said lever member include a cooperating indicia to indicate the relative positioning of said magnetic permeable element with respect to said magnet means.

4. The pressure relief valve of claim 3 in which the movement of the shaft of said valve closure member upon a predetermined pressure differential applied thereto under the condition of excess of normal pressure in the primary conduit being effective to pivot said intermediate lever and said pivoted lever member such that the magnetic permeable element is removed from the influence of the magnet means and must be manually reset to return the valve closure member into engagement with the valve seat.

5. The relief valve of claim 2 and including yoke means connecting the intermediate lever and said pivoted lever member to limit movement of said magnetic permeable element relative to said magnet means.

References Cited by the Examiner

UNITED STATES PATENTS

| | | | |
|---|---|---|---|
| 64,070 | 4/1867 | Burridge | 137—531 |
| 2,448,231 | 8/1948 | Molloy | 251—65 XR |
| 2,589,188 | 3/1952 | DeCraene | 251—65 |
| 2,597,952 | 5/1952 | Rosenlund | 137—528 |
| 2,708,944 | 5/1955 | Modine | 251—65 XR |
| 3,017,897 | 1/1962 | Seguenot | 137—529 |

FOREIGN PATENTS 587,030   1/1959   Italy.

WILLIAM F. O'DEA, *Primary Examiner.*

HAROLD WEAKLEY, *Examiner.*